United States Patent [19]
Wulfing

[11] Patent Number: 4,895,318
[45] Date of Patent: Jan. 23, 1990

[54] MAGNETIC TAPE TRANSPORT WITH SIMPLIFIED THREADING ARRANGEMENT AND RELATED METHOD

[75] Inventor: George Wulfing, Huntington, N.Y.

[73] Assignee: TDX Peripherals, Inc., Hauppauge, N.Y.

[21] Appl. No.: 249,722

[22] Filed: Sep. 27, 1988

[51] Int. Cl.$^4$ .............................................. B65H 23/00
[52] U.S. Cl. .................................... 242/195; 242/76; 226/91
[58] Field of Search .................. 242/179, 195, 67.1 R, 242/76; 226/91, 92; 360/90

[56] References Cited

U.S. PATENT DOCUMENTS

| | | | |
|---|---|---|---|
| 3,190,575 | 6/1965 | Hayner et al. | 226/92 X |
| 3,512,694 | 5/1970 | Sugaya et al. | 226/91 |
| 3,761,035 | 9/1973 | Wang | 242/195 X |
| 4,267,951 | 5/1981 | Grant et al. | 242/76 X |

Primary Examiner—David Werner
Attorney, Agent, or Firm—Roberts, Spiecens & Cohen

[57] ABSTRACT

A tape transporter is provided with elements to straighten out the normally sinuous tape supply and tape take-up paths of a magnetic tape apparatus in order to facilitate the threading of a magnetic tape into a tape reading and/or recording system. This control of the paths is accomplished by incorporating displaceable guides or idlers into an endless loop the displacement of which is used to control the positioning of the guides or idlers.

18 Claims, 4 Drawing Sheets

MAGNETIC TAPE TRANSPORT WITH SIMPLIFIED THREADING ARRANGEMENT AND RELATED METHOD

FIELD OF INVENTION

This invention relates to magnetic tape transport systems and more particularly to tape transport systems which utilize mechanical buffers or the like. The invention also relates to methods for threading and handling magnetic tape.

PRIOR ART

In the past decade, designers of tape transports for minicomputer systems have attempted to keep pace with rising mainframe computation rates by increasing the tape velocities and hence the data readout rates of those transports. As a result of their work, there is currently available a 75-ips tape transport, which can record 120,000 bytes/sec.

Rising tape velocity, however, involves far more than simply installing faster capstan and reel motors. Tape-transport designers must display some fancy footwork in dealing with basic laws of physics (force=mass×acceleration), which would otherwise expose the speeded-up tape to excessive tension during start and stop operations. Tape tension problems can assert themselves rapidly, because the tension on a tape increases with the square of tape velocity.

No fundamental problem exists in designing a capstan servo system to bring a tape rapidly up to whatever speed is required. It's an entirely different matter, however, to accelerate and decelerate large reels of ½" tape at the same rate. Accordingly, all digital reel-to-reel recorders use some form of tape buffer that stores a short length of tape and permits the capstan to make a fast getaway while the supply and takeup reels are brought more gradually up to speed.

Conventional transports designed for tape velocities of 45 ips and below use a spring loaded tension arm to achieve buffering. During acceleration from a standstill, the capstan draws tape from the upper tension arm and pulls the arm upward against a spring force in the process. Because the capstan also starts much faster than even an empty take-up reel, the lower tension arm also moves upward to absorb the few inches of startup tape while the take-up reel speeds up.

The positions of both tension arms are monitored by photocells or other sensors, which develop control signals that govern the torque and speed of the two independent reel drive servos. The larger the tension arm displacements from a central position, the larger the servo drive signals grow. In applications where the tape makes a series of rapid starts and stops, the average position of the tension arm indicates the average tape velocity, which in turn depends upon the drive's on/off duty cycle.

During tape deceleration, the capstan comes to a rapid halt, an action that requires the tension arms to provide buffering against reel overshoot. The upper tension arm then absorbs tape from the supply reel, while the lower tension arm delivers tape to the take-up reel; as a result, both arms swing from their upward position and tilt downwards.

As tape velocity increases, the tension arm method of tape buffering grows ineffective. The tape itself must provide the force to accelerate the tension arms, and at higher levels of acceleration, the force required to accelerate even the most advanced tension arm designs exceeds the permissible 8-oz. limit that the tape is permitted to transmit. Accordingly, for tape velocities exceeding about 45 ips, designers have adopted vacuum column buffering methods.

In a vacuum column buffer, the tape is stored in two separate chambers, which serve the same function as tension arms. A vacuum pump sustains reduced air pressure within each chamber, thereby sucking a loop of tape into each vacuum column. Position sensors, either photocell- or air-pressure-operated, monitor tape position and send appropriate control signals to the reel motors to maintain correct loop lengths within each chamber.

The advantage of the vacuum column buffer lies in the complete absence of any extraneous mass, other than the tape's, that must be rapidly accelerated or decelerated during each start and stop operation. Consequently, vacuum column methods provide the ultimate in high-speed tape transports, and some firms offer massive installations that achieve 250 ips.

However, used in minicomputer based systems, vacuum column transports are not without their penalties. The hiss of leaking air can be annoying when many transports operate in a confined location. Weight, power consumption, and parts count are also substantially higher for vacuum transports than for other types. In addition, the vacuum system can suck dust into contact with the drive's magnetic heads and tape surfaces.

Further, unless the tape transport is encased in a hermetically sealed enclosure, vacuum column buffers must be confined to systems that operate at normal atmospheric pressures. This means, for example, that few tape transports operating at faster than 45 ips (72,000 bytes/sec) have found use in high-altitude applications, either for flight testing of aircraft prototypes, or in military systems.

Another drawback of vacuum column transports is the care required to restart them after a power blackout. If emergency shutdown allows the tape loops to escape from the vacuum chambers, or simply allows the tape to twist within a chamber, a subsequent start can spill several hundred feet of tape onto the computer room floor. Manually aided restarting is usually required in such circumstances.

Lastly, because the vacuum column transport has more parts, including a motor driven vacuum system, its statistical mean-time-before-failure (MTBF) is lower than a tension arm unit's and the vacuum column transport is invariably heavier than, and draws substantially more power than, its tension arm alternative. If the transport, with other peripherals, is operated from an uninterruptible power supply or stable source, this power rating becomes economically significant.

Another available tape transport attains operating velocities normally confined to vacuum column transports by using a mechanical shuttle for tape buffering. To appreciate the theoretical validity of the shuttle's design, some of the basic principles and specifications involved, particularly the ANSI inter-record gap requirements that set tape start and stop conditions, and the values for minimum mass that the tape must accelerate during start and stop operations must be examined.

Graphical representation of the ANSI inter-record-gap specifications for a 12.5-ips to 130-ips range of tape velocities shows that the specification calls for a minimum 0.5" tape length between blocks of recorded data. Because a central processor or other equipment can require a drive to bring the tape to a complete halt at the end of one data block and then accelerate it from standstill in readiness for reading the next data block, only 0.1875" of tape is available for individual start and stop operations.

Industry adheres to this 0.1875" start/stop travel requirement, which conceals a tough dynamic barrier that tape transport designers must overcome. A design that calls for the tape to attain final velocity in a fixed amount of travel, regardless of the velocity aimed for, implies an acceleration that rises with the square of that velocity. This implies that the forces impressed on the tape (force=mass×acceleration) also rise with the square of tape velocity, which is why industry has been obliged to use vacuum column methods of mass-free buffering for tape velocities beyond 45 ips.

Tape velocity rises and falls linearly, producing an average velocity during these transient periods equal to half the normal operating velocity. Consequently, a tape traveling at 12.5 ips (6.25 ips average) must be stopped in 0.1875/6.25=30 ms. Starting requires the same amount of time and tape travel. On the other hand, tape traveling at 75 ips must stop in 0.1875/37.5=5 ms, and accelerate to full speed in the same time and distance.

Tape transports designed to accelerate and decelerate the tape in a constant time, rather than a constant distance, would simply require capstan acceleration to increase linearly with ultimate tape velocity. However the ANSI inter-record-gap specification imposes a further demand upon capstan acceleration, by progressively reducing the time available to attain successively high tape velocities. The end result is a twofold effect, requiring capstan acceleration to rise not linearly, but with the square of ultimate tape velocity.

The real concern in tape transport design is not so much pure acceleration as the stresses imposed on a tape during the acceleration period. Industry standards for tape tension set a figure of 8 oz. Consequently, to hold tension during acceleration below the value equivalent to this 8-oz. figure, the masses associated with the tape, including tension arms, must be reduced inversely with the square of tape velocity.

A shuttle buffering method is shown in U.S. Pat. No. 3,637,161. In a conventional tension arm buffer during acceleration both arms swing upward in unison. The upper arm moves in response to tape tension transmitted via the fast-accelerating capstan while the lower arm is pulled upward by its own spring tension. Once the arms are displaced from their equilibrium positions, their movements develop individual error signals that set the drive's reel motors in motion. Each reel motor operates under its own independent servo control, using tension arm travel as its error input. When capstan deceleration stops the tape, both tension arms swing downward. The takeup reel's momentum causes it to draw tape from the lower tension arm, while the supply reel delivers tape to the upper tension arm. New error signals adjust individual reel motor torques to maintain correct tension in the stationary tape.

Because both tension arms swing up and down together, they could be hypothetically replaced by a single tension arm that carries both upper and lower tape idlers. The next step in this hypothesis would be to extend the tension arm length to infinity, an action that would change tape idler travel from an arc to a straight line. In final transition form tension arm to shuttle, the shuttle system eliminates this single infinite-length tension arm altogether, and mounts the two tape idlers on a lightweight framework (the shuttle), which is free to move up and down in response to the capstan's pull. This shuttle buffering method exchanges mechanical complexity—and considerable mass—for servo sophistication. It also replaces the multiple pairs of tape loops required in higher-speed tension arm transports with a single pair of tape loops.

From a control standpoint, one information source is missing. It is impossible to control two reel motors, both of which must operate at different speeds and torques, with only one error signal. Although the shuttle position detector can provide the basic drive to both reel motors, a further source of information is required to give the motors differential speed/torque control. In a further design, a spring-loaded sensor monitors the length of tape in the loop between the two tape reels. This additional sensor provides the differential error signal required for reel motor control and allows the motors to hold tape between reels to within ±1" of a nominal value.

While the tape transport system of U.S. Pat. No. 3,637,161 has proven to be very successful, it has a significant drawback in that the nature of the pulley system with respect to the slider makes the tape path extremely complicated and it is difficult at set up to thread a tape either manually or automatically through the system. In particular, the complementary buffers used in the transport require a complicated tape path to be threaded such that it is necessary to thread half of the slider and then move the slider its entire length to thread the other half.

BRIEF SUMMARY OF THE INVENTION

It is a general object of the invention to provide an improved tape transport system.

It is another object of the invention to provide an improved tape transport system which has the advantages of the system of the above-mentioned U.S. Pat. No. 3,637,161 but which, at the same time, permits simple threading of the associated tape.

Another object of the invention is to provide an improved tape system having adjustable feed and take-up sections which are arranged to facilitate threading of the tape through the sections.

Still another object of the invention is to provide improved methods inter-relating the initial threading of tape and the subsequent balancing of tape feed and make-up.

To achieve and other objects of the invention, there is provided in accordance with a preferred embodiment thereof a process for utilizing magnetic tape which comprises threading the tape through feed and take-up sections each including an alignment of guides at least one of which is movable. These guides define a generally rectilinear path in the associated section. The procedure further includes displacing at least one of the guides in each section to modify the associated rectilinear path to become a sinuous path and displacing the tape through the thusly formed sinuous feed path and past a transducer and taking up the tape through the thusly formed sinuous take-up path. Thereafter, variations in tape feed and take-up rates as determined by sensing tape tension and/or length are compensated by displacing the movable guides thereby to modify the sinuous paths.

According to a feature of the invention, the movable guides are mounted at spaced positions on a flexible member and the flexible member is displaced thereby to displace the movable guides to form the generally rectilinear and sinuous paths. Furthermore, the flexible member is preferably formed as a closed loop having a closed loop path with the movable guides having a common direction of movement along the closed loop path.

According to still a further feature of the invention, the closed loop is deformed to displace the movable guide and to modify the shapes of the feed and take-up paths.

As will be seen hereinbelow, the invention is described in terms of a preferred embodiment. This involves spring loading a portion of the closed loop to establish a normal position of rest for the same and deforming another portion of the closed loop to displace the first said portion from the position of rest and to enable the movable guides to move in the same absolute direction to modify the shapes of the feed and take-up paths. Furthermore, provision can be made for deforming the second above-mentioned poriton by electro-mechanical engagement of the same.

In otherwise achieving certain of its objects and advantages, the invention is concerned with a tape transport having a controllably rotatable supply reel, a controllably rotatable take-up reel, a capstan-head means to move tape for reproducing or recording, a fixed supply reel idler for guiding tape from the supply reel towards the capstan-head means, a fixed take-up idler for guiding tape from the capstan-head means to the take-up reel, and a tape movement sensor for controlling the rotation of the reel. In this transport, there is contemplated the improvement which provides a movable supply idler means for guiding tape in a U-shaped path from the fixed supply idler to the capstan-head means, and a movable supply idler for guiding tape in a U-shaped path from the capstan-head means to the fixed take-up idler means. There is also provided a first non-stretchable flexible line or ribbon interconnecting the movable idler means with a first guide means guiding the first line or ribbon along a first path. Moreover, there is provided a second non-stretchable flexible line or ribbon interconnecting the movable idler means and a second guiding means for guiding the second line or ribbon along a second path whereby movement of one of the movable idler means in response to tape pulled by the capstan-head means results in similar movement by the other movable idler means. Thus, tape movement in the tape portion between the fixed idler means in response to the pull of the capstan means is isolated from the reels. Further, there is provided means for connecting one of the flexible lines or ribbons to the tape positioning sensor means to give an indication of the amount of incremental movement of the tape portion between the fixed idler means.

BRIEF DESCRIPTION OF THE DRAWING

Other Objects, features and advantages of the invention will be apparent from the following detailed description as illustrated in the accompanying drawing in which.

DETAILED DESCRIPTION OF THE PREFERRED EMBODIMENT OF THE INVENTION

In accordance with the invention, there is provided a system and method whereby tape feed and take-up sections are controlled to balance tape feed and take-up to minimize the stresses to which the tape is subjected. To accomplish this, each section is provided with a system of guides or idlers some of which are fixed and some of which are movable or displaceable to make path adjustments.

As will be seen hereafter, according to the illustrative embodiment of the invention, movable carriages supporting idlers are mounted in a closed loop capable of being displaced in clockwise or counter clockwise directions. These idlers are respectively incorporated into the tape feed and take-up sections and, in operation, are both displaced together in either clockwise or counter clockwise direction to provide path adjustment to balance feed and take-up. This simultaneous displacement with the associated closed loop while being satisfactory for path adjustment is not, however, satisfactory for smoothing out sinuous paths in the feed and take-up sections for purposes of facilitating threading operations. This is due to the relative positions of fixed guides or idlers and associated movable guides or idlers as will become more apparent here-in-below.

To provide for smoothing out such sinuous paths, an alternative is provided with respect to the fact that in the closed loop (with the loop itself being displaceable along its own length) movements of the movable guides or idlers may be simultaneously clockwise or counter clockwise and therefore, in the system illustrated, respectively up and down (North and South) or vice versa for the respective guides. Stated more simply, in the closed loop of the invention, one guide or idler may be moving up while the other guide or idler is moving down or vice versa. For smoothing out the sinuous paths, however, simultaneous movements in the same absolute directions (e.g., up-up, North-North) may be desirable to facilitate threading.

The illustrative embodiment thus provides for an ancillary mechanism and procedural steps which enable the loop to be deformed and/or displaced to accomplish simultaneous displacement of the movable idlers in the same absolute direction. In the preferred embodiment, this is achieved by spring loading the loop in one zone (or possibly more) and providing a loop deformer in another zone whereby the movable guides may be simultaneously displaced in the same absolute direction to smooth out the sinuous paths in the feed and take-up sections and facilitate threading as will be further explained hereinafter. The threading itself may be accomplished manually or automatically by known types of systems including air jets, etc. (not shown).

The method of the invention thus involves two steps. In one step for purposes of threading tape, the sinuous arrangement of two sets of guides is made to approach or achieve recilinearity by the simultaneous unidirectional displacements of some of the guides even though the guides are connected to each other in closed loop fashion. In another step, these same guides are made displaceable in opposite absolute direction for tape feed and take-up compensations.

In the following description, care should be take to distinguish between tape path and closed-loop path as well as between absolute (North-South, up-down) and clockwise or counter clockwise directions.

Figure 1:
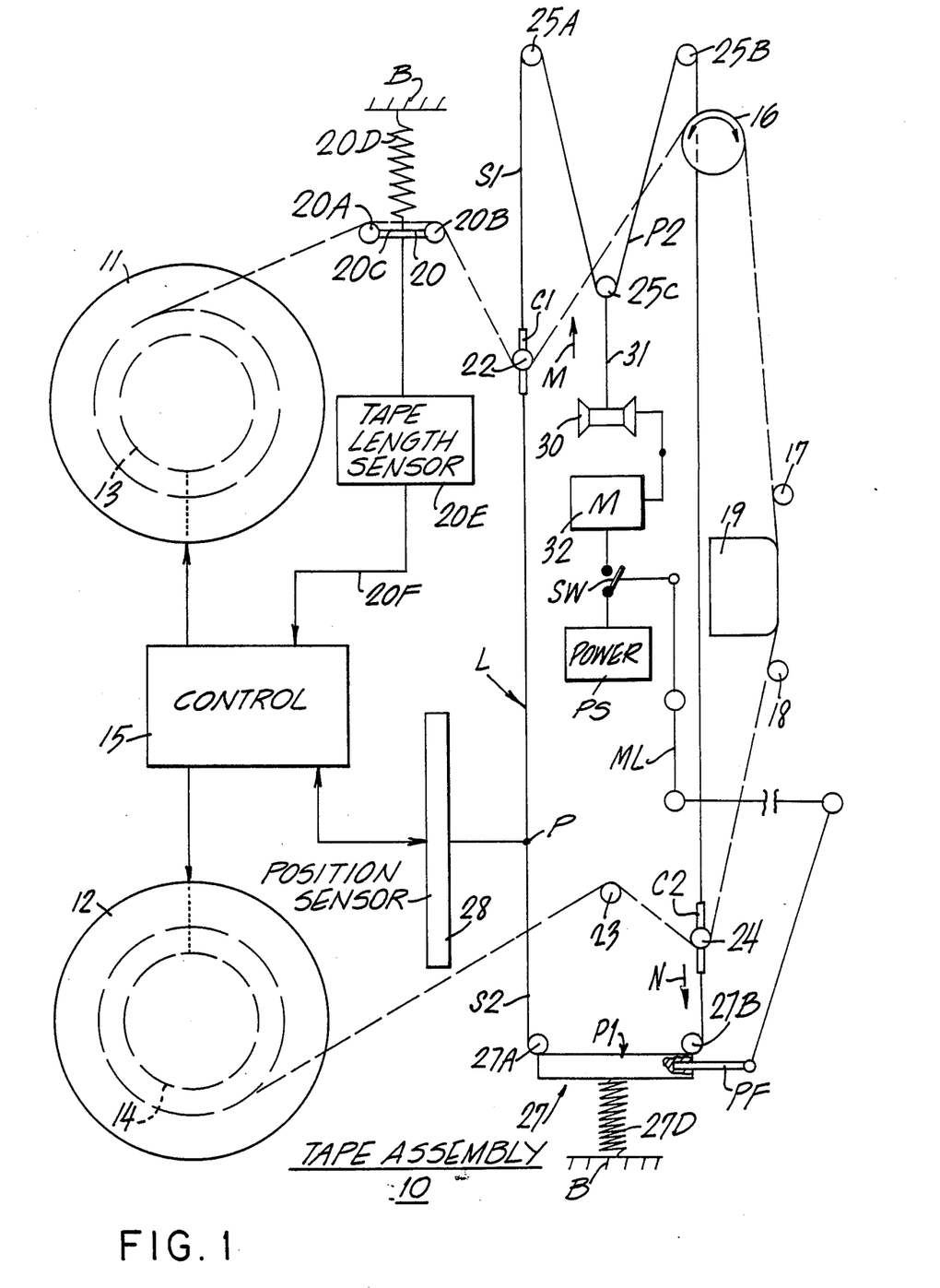
FIG. 1 diagrammatically shows a tape transport provided with guides or idler controls in accordance with an illustrative embodiment of the present invention and with the tape in dotted lines for purposes of simplification.

Referring next to the drawing, FIG. 1 shows a tape transport assembly 10 in which the elements are mounted on a base plate B or similar structure the details of which are not necessary for an understanding of the invention and are therefore not shown. The assembly 10 includes a supply reel 11 and a take-up reel 12. The reels can be driven clockwise or counterclockwise as determined by the supply reel motor 13 driving the supply reel and the take-up reel motor 14 driving the take-up reel. The motors are identical and their operation is controlled by a control unit 15. Capstan 16 is used to drive tape from the supply reel 11 between the guide rollers 17 and 18 and past the transducer or head assembly 19 to the take-up reel 12.

Between the supply reel 11 and the capstan 17, the tape will move in a sinuous or U-shaped feed path FP (FIG. 3) over a translationally fixed idler 20 which acts in conjunction with a tape tension sensor device 20E (FIG. 1). In particular, the device includes a fixed roller 20A having an arm 20C extending to a swingable roller 20B. The arm 20C is spring biased in upward direction by a spring 20D connected between the base plate B and the arm 20C. Connected to the arm 20C is the position or tape tension or length sensor 20E which is of known design (see U.S. Pat. No. 3,637,161) and which feeds signals via the line 20F to the control 15. With regard to the present invention, either the idler 20A or the idler 20B can act as a fixed idler. In addition, in the tape path between the supply reel 11 and the capstan 16 is a movable idler 22.

Between the head assembly 19 and the take-up reel 12 along takeup path TP (FIG. 3), there is operatively positioned a fixed guide or idler 23 which is fixed to the base plate B. Between the fixed guide or idler 23 and the head assembly 19, there is operatively disposed another movable guide or idler 24. In operation, the tape follows the total path shown in FIG. 3. Specifically, it travels from the supply reel 11 over the fixed roller 20A and the swingable roller 20B, around the movable guide or idler 22, over the capstan 16, between the guides or idlers 17 and 18 and the head assembly 19, past the movable guide or idler 24, over the fixed guide or idler 23 to the take-up reel 12. It should be noted that the movable guide or idler 22 creates a U-shaped or sinuous path FP for the tape between the roller 20B and the capstan 16. Similarly, the roller 24 establishes a U-shaped or sinuous path TP between the head assembly 19 and the fixed idler 23.

Returning to FIG. 1, it is seen that the movable idlers 22 and 24 are interconnected to move in unison around a closed loop L. In particular, a first flexible line or ribbon of non-stretchable material S1 connects one end of the carriage C1 for the idler 22 via a first fixed pulley 25A, a second fixed pulley 25B, and a movable pulley 25C to carriage C2 for movable pulley 24. The assembly of pulleys thus guides the line or ribbon S1 from the idler 22 to the idler 24. In addition, a similar line or ribbon S2 connects the other end of the carriage C1 of the idler 22 to the other end of the carriage C2 of the idler 24 thus forming a closed loop. The line S2 passes more specifically through a tensioning assembly including two pulleys 27A and 27B mounted on a support connected by a tensioning spring 27D to another portion of the base plate B. In the aforegoing assembly, the movable idlers 22 and 24 thus move in a common direction through closed loop L the bottom portion of which is loaded by a force provided by the spring 27D.

In addition, the line S2 is mechanically connected to a position sensor 28 which feeds signals to the control 15 depending on the vertical position of the portion P on the line S2. Thus, if the movable idler 22 moves upward in response to the tape's being pulled by the capstan 16, the movable idler 24 moves downward and the point P moves upward. The position of the point P causes the control unit to feed signals to the reel motors 13 and 14 to cause reel 11 to pay out tape and reel 12 to takeup tape at controlled related rates. Since the invention is not concerned with the details of the actual controls and the movement of the tape, there will be no further description of such movement and control herein. However, their movement and control may be as shown in U.S. Pat. No. 3,637,161 and the control circuits and servo systems thereof can be employed in the apparatus of the present invention.

The present invention is concerned with the automatic threading of the tape to set up operations initially. The threading operation is facilitated by the use of movable pulley 25C which is connected by line 31 to a drum 30 which is rotationally driven by a motor 32. When a tape is to be threaded, the motor 32 is energized by closing switch SW coupled to power source PS thereby drawing in line 31 which effectively pulls the movable pulley 25C downward. This causes an upward movement of the movable idler 24 (see FIG. 2) against the force of spring 27D to align idler 22 more nearly rectilinearly with idlers 20A and 20B and capstan 16. The tape can then be threaded over the idlers 20A and 20B, under the movable idler 22, and over the capstan 16 in a comparatively straight rectilinear path. The tape is then bought down over the head 19. From this position, the tape is moved in a rectilinear path under the movable idler 24 and over the fixed idler 23 to the take-up reel 12. This is facilitated since idler 24 has been displaced upwardly (due to operation of motor 32 and drum 30) more nearly into rectilinear alignment with idler 23 and reel 12. After this, the tape can be fixed to the take-up reel 12. Then, the motor 32 is reversed and movable idlers 22 and 24 moved downwardly to the positions shown in FIGS. 1 or 3. It will be noted that switch SW is coupled to mechanical linkage ML which can also be operated independently. The purpose of this is to operate a position fixing member PF which holds support 27 in fixed position along with pulleys 27A and 27B except when tape threading is to be accomplished. The result is to render spring 27D ineffective except when idlers 22 and 23 are to be displaced.

Thus, it is seen that there is no need to go through a complicated sinuous threading operation even though a sinuous tape path is ultimately desired for the tape operation. One need only run the tape from the reel 11 to the capstan 16 and from the capstan 16 via the head 19 to the reel 12. Accordingly, the invention provides improvements of the tape drive disclosed in U.S. Pat. No. 3,637,161. Such improvements permit a very simple means for threading the tape.

In summary, the invention both includes and works with a system in which one or more buffers in the form of an adjustable sinuous path or paths enable tape takeup to be correlated with tape feed. This adjustment is accomplished in a preferred embodiment by causing idlers or guides respectively at the feed and take-up ends of the systems to be moved in relatively opposite directions thereby providing for controllably adjusting the lengths of the feed and take-up paths. The invention provides furthermore for the moving of the idlers or guides at the opposite ends in the same rather than opposite directions to flatten out the sinuous paths for threading purposes. In the illustrated embodiment both steps (i.e., feed and take-up control and threading) are accomplished with the use of an endless loop on which the movable idlers move in the same clockwise (or counter clockwise) direction during system operation (see arrows M and N, FIG. 1)—but in which these idlers move in the same upward (or downward) absolute direction (see arrows G and H, FIG. 2) to flatten out the sinuous paths for threading. The technique employed herein can be employed to displace other of the guide elements such as, for example, idler 23.

As has been indicated hereinabove, the invention relates not only to an apparatus or system but furthermore relates to a process for utilizing magnetic tape. This process provides for threading the tape through feed and take-up sections FP and TP, each including an alignment of guides or idlers at least one of which is movable and which define a generally rectilinear path as shown by arrows R1 and R2 in FIG. 2. The procedure furthermore involves displacing at least one of the guides in each section to modify the associated rectilinear path to become a sinuous path. These are for example the idlers 22 and 24 (see FIGS. 1 and 2). The sinuous paths are indicated by arrows S3 and S4 (see FIG. 3). Continuing on, the procedure involves displacing the tape by means of the capstan 16 through the thusly formed sinuous feed and take-up paths S3 and S4 to move the tape past the head or transducer 19. Variations in tape feed and take-up rates as detected by the tape length or tension sensor 20 and as guaged in part by position sensor 28 are processed in control 15 as was previously done according to U.S. Pat. No. 3,637,161 and point P on the closed loop L is displaced back and forth about a central position to displace the guides or idlers 22 and 24 which move in a common direction about the closed loop path, thereby to adjust the respective sinuous paths and compensate the feed and take-up rates as aforesaid.

According to a further aspect of the process of the invention, the movable guides are, as has already been indicated, positioned at spaced positions on a flexible member, and this flexible member is displaced to displace the movable guides to form the generally rectilinear and sinuous paths as well as modifications of these sinuous paths. It has already been noted that the flexible member is formed as a closed loop including sections S1 and S2.

According to another aspect of the invention, the closed loop is deformed to displace the movable guides and modify the shapes of the feed and take-up paths. Preferably this is accomplished by spring loading the portion P1 of the closed loop to establish a normal position of rest as illustrated in FIG. 1 and deforming another portion P2 of the closed loop to displace the first said portion from the position of rest to the position illustrated for example in FIG. 2 with the spring 27D distended. This enables the movable guides to move in the same absolute directions (see arrows G and H) to modify the shapes of the feed and take-up paths. The process as has been indicated hereinabove involves deforming the second portion P2 by electro-mechanical engagement of the same although the use of tension arms and the like may also be brought into play by appropriate modification.

Figure 2:
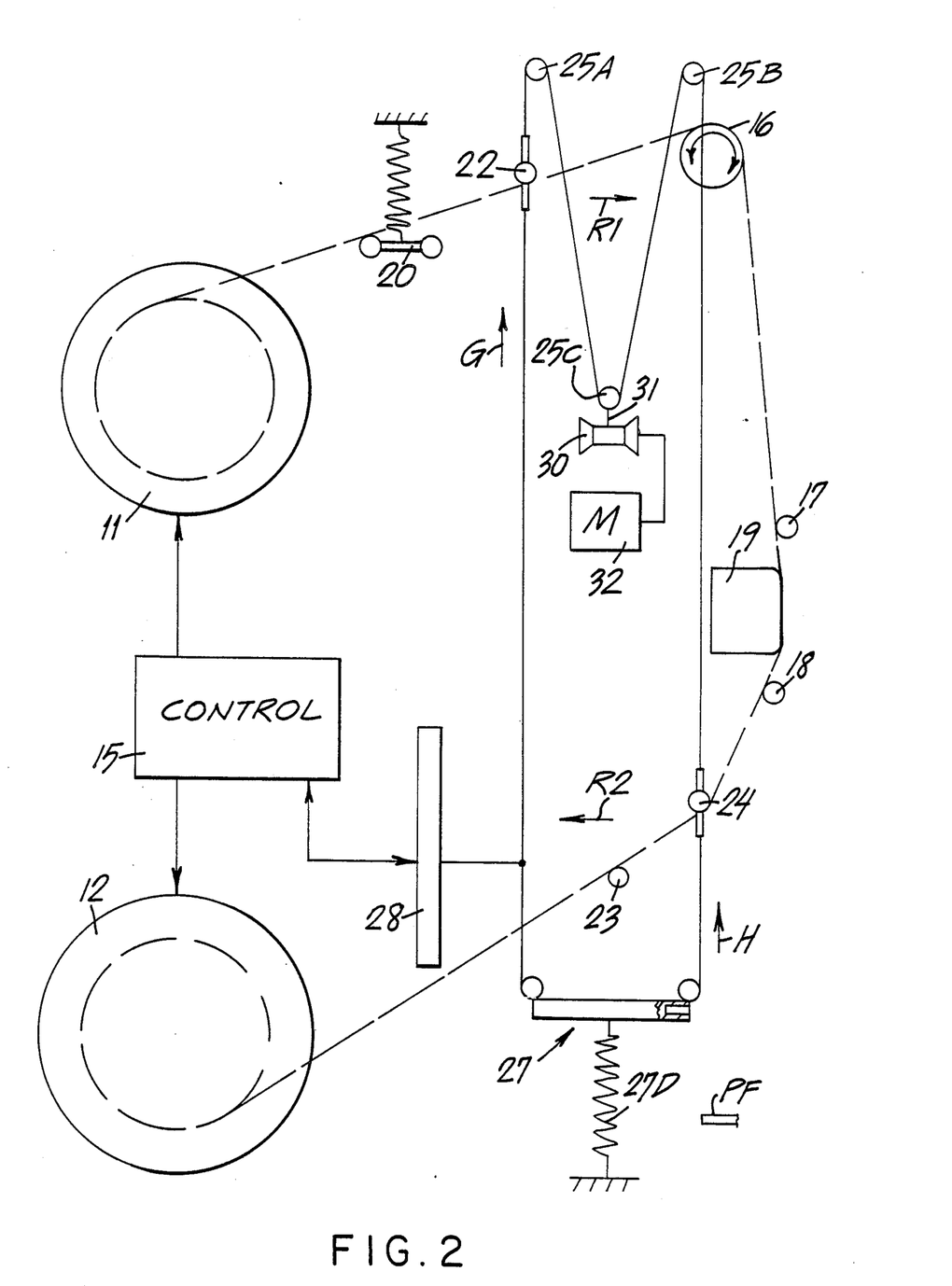
FIG. 2 shows the tape transport of FIG. 1 with the idler mechanisms displaced for the threading of tape.
Figure 3:
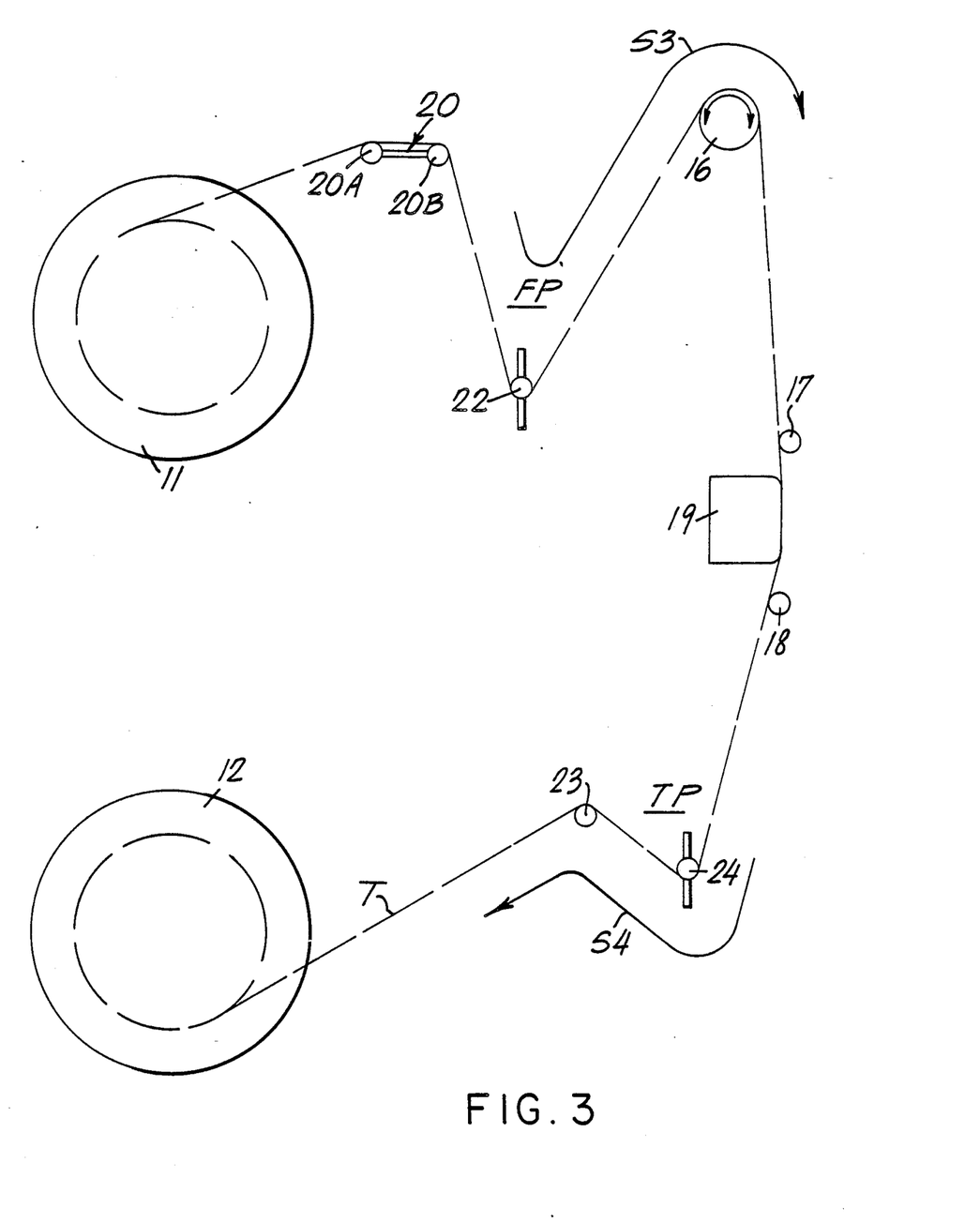
FIG. 3 shows the tape transport of FIG. 1 with tape threaded for operation but with the details of the idler and control systems omitted.

In the illustrative embodiment appearing in FIGS. 1–3, the sinuous tape paths are shown as being spread out horizontally and are thus more or less V-shaped. It is preferred, however, that the tape follow paths which are more nearly U-shaped with substantially parallel tape segments leading toward and away from the respective guides or idlers.

Figure 4:
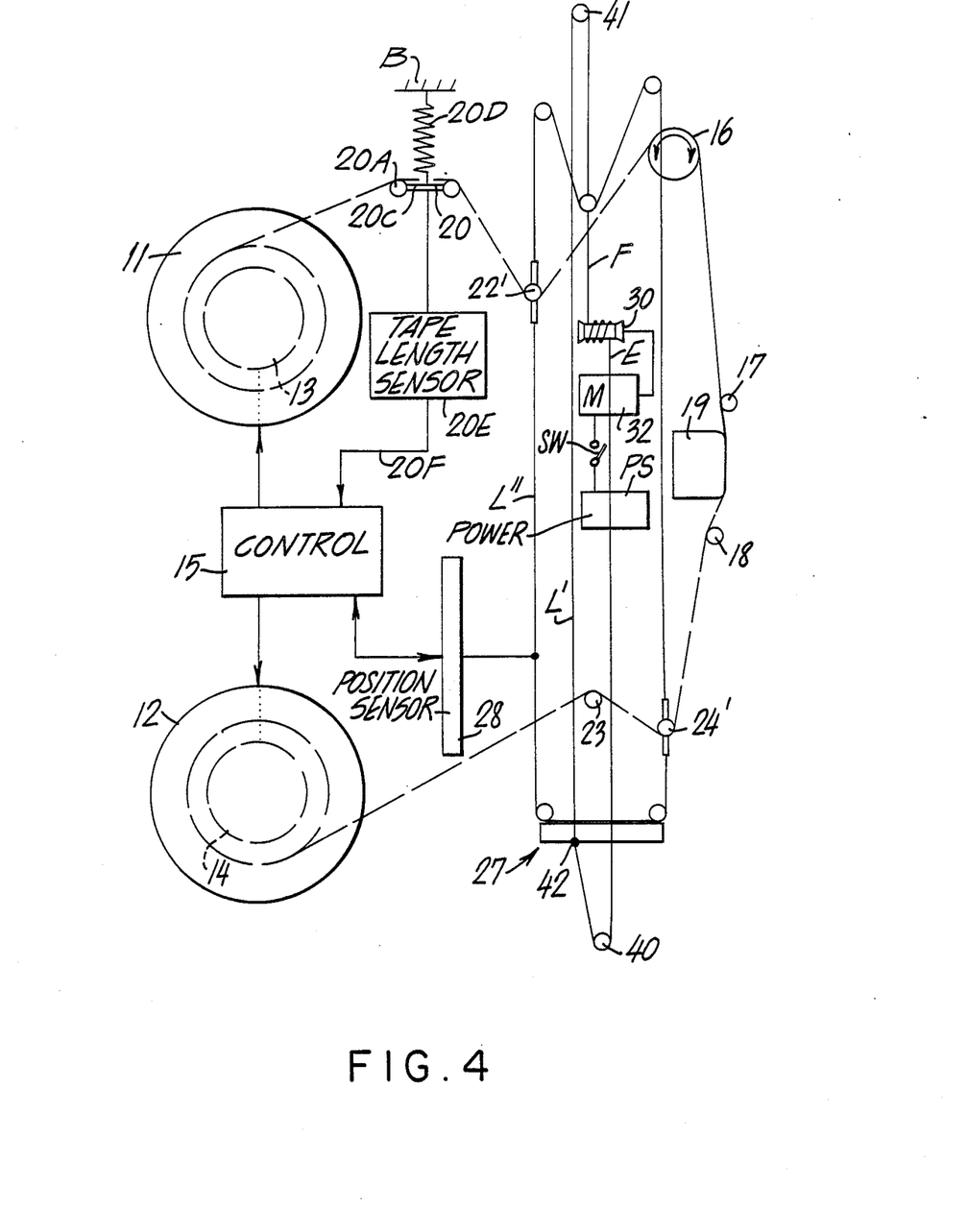
FIG. 4 diagrammatically illustrates a preferred embodiment of the invention.

It will also be noted that the provision is made in FIGS. 1–3 to avoid the undesired effects of energy storage in spring 27D by locking the support 27 in position except when threading is to be facilitated. This is accomplished in another way be omitting the spring 27D in entirety in the preferred embodiment shown in FIG. 4. In the preferred, embodiment reels 11 and 12 and the associated tape and guides and other parts are arranged and used substantially as in FIGS. 1–3. A non-stretchable loop L' is passed around fixed idlers 40 and 41. In loop L' are connected displaceable guides or idlers 22' and 24' the purposes of which are to define and flatten out sinuous (or U-shaped) paths as in the first described embodiment. The loop L" is moreover connected at 42 to support 27 which is therefore moved up and down in accordance with movement of the loop L' Motor 32 is reversible. As tape is wound onto windlass 30 at E, it is paid out at F and vice versa. This causes guides or idlers 22' and 24' to move upwards simultaneously or downwards simultaneously. Thus the sinuous paths are established or flattened under control of motor 32.

While only two embodiments of the invention have been shown and described in detail, there will now be obvious to those skilled in the art many modifications and variations satisfying many or all of the objects of the invention, without departing from the scope of the invention as defined in the following claims.

What is claimed is:

1. In a tape transport having a controllably rotatable supply reel means, a controllably rotatable take-up reel means, a capstan-head means to move tape for reproducing or recording, a translationally fixed supply idler means for guiding tape from the supply reel toward the capstan-head means, a translationally fixed take-up idler means for guiding tape from the capstan-head means to the take-up reel, and tape movement sensing means for controlling the rotation of the reels, the improvement comprising a translationally movable supply idler means for guiding tape in a U-shaped path from the translationally fixed supply idler means to the capstan-head means, a translationally movable take-up idler means displaced from said translationally movable supply idler means for guiding tape in a U-shaped path from the capstan-head means to the translationally fixed take-up idler means, a first non-stretchable flexible means interconnecting said translationally movable idler means, a first guiding means for guiding said first flexible means along a first path, a second non-stretchable flexible means interconnecting said translationally movable idler means, a second guiding means for guiding said second flexible means along a second path whereby movement of one of said translationally movable idler means in response to tape pulled by the capstan-head means results in complementary movement by the other of said translationally movable idler means so that tape movement in a portion of the tape between the translationally fixed idler means in response to the pull of the capstan means is isolated from the reels, and means for connecting one of said flexible means to said tape position sensing means to give an indication of the amount of movement of said tape portion.

2. The tape transport of claim 1 wherein one of said guiding means comprises spring biased idler means for maintaining said flexible means under tension.

3. The tape transport of claim 2 wherein the other of said guiding means comprises controllably translationally movable pulley means for pulling said other flexible means to move both of said translationally movable idler means simultaneously in the same direction whereby a substantially rectilinear tape travel path exists between the translationally fixed supply idler and the capstan-head means and a substantially rectilinear tape travel path exists between the translationally fixed take-up idler and capstan-head means.

4. The tape transport of claim 1 wherein said controllably movable pulley means comprises first and second fixed pulleys and a translationally movable pulley interposed between said fixed pulleys for constraining said other flexible means to move in a U-shaped path between said fixed pulleys and means for controllably pulling said translationally movable pulley in a direction such that the length of said U-shaped path is increased whereby said translationally movable supply idler is pulled toward said first fixed pulley and said translationally movable take-up idler is pulled toward said second fixed pulley.

5. A tape transport system including tape supply and take-up reels, a capstan, a head, first means to guide the tape along a sinuous path from said supply reel to said capstan, second means to guide the tape along a sinuous path from said head to said take-up reel, and path control means associated with at least said first means to straighten the sinuous path thereof to facilitate the threading of said tape therethrough; the path control means being further associated with said second means to straighten the sinuous path thereof; said path control means including first and second idler carriage means displaceable to control said sinuous paths, said first and second means including idlers on said carriage means for the straightening of said sinuous paths; said path control means comprising further means to connect said carriage means in an endless loop and loop control means to alter the shape of said loop whereby to displace said idlers.

6. A tape transport system as claimed in claim 5 wherein said further means includes non-stretchable flexible means connecting said carriage means in said loop.

7. A tape transport system as claimed in claim 5 comprising position sensing means associated with said further means to control the operation of said reels.

8. A tape transport system as claimed in claim 7 comprising control means coupled to said reels and position sensing means to drive said reels under the control of said position sensing means.

9. A tape transport system as claimed in claim 8 comprising tension sensing means operatively associated with said tape and with said control means to control the latter in accordance with tension in said tape.

10. A tape transport system including tape supply and take-up reels, a capstan, a head, first means to guide the tape along a sinuous path from said supply reel to said capstan, second means to guide the tape along a sinuous path from said head to said take-up reel, and path control means associated with at least said first means to straighten the sinuous path thereof to facilitate the threading of said tape therethrough; the path control means being further associated with said second means to straighten the sinuous path thereof; said path control including first and second idler carriage means displaceable to control said sinuous paths, said first and second means including idlers on said carriage means for the straightening of said sinuous paths; said system further comprising a further means to connect said carriage means in an endless loop and control means to displace said loop and thereby said idlers.

11. A tape transport system as claimed in claim 10 wherein said control means includes means to displace said loop clockwise and counter clockwise respectively.

12. A process for utilizing magnetic tape comprising threading the tape through feed and take-up sections each including an alignment of guides, at least one of which is movable, defining a generally rectilinear path in the associated section, displacing at least one of the guides in each section to modify the associated rectilinear path to become a sinuous path, displacing the tape through the thusly formed sinuous feed path and past a transducer and taking up the tape thorough the thusly formed sinuous take-up path, and compensating variations in tape feed and take-up rates by displacing the movable guides thereby to modify the sinuous paths; said method further comprising positioning the movable guides at spaced positions on a flexible member and displacing the flexible member to displace the movable guides to form the generally rectilinear and sinuous paths.

13. A process as claimed in claim 12 wherein the flexible member is formed as a closed loop having a closed loop path with the movable guides having a common direction of movement along the closed loop path.

14. A process as claimed in claim 13 comprising deforming the closed loop to displace the movable guides and modify the shapes of the feed and take-up paths.

15. A process as claimed in claim 14 comprising spring loading a portion of the closed loop to establish a normal position of rest for the same and deforming another portion of the closed loop to displace the first said portion from the position of rest and to enable the movable guides to move in the same absolute direction to modify the shapes of the feed and take-up paths.

16. A process as claimed in claim 15 comprising deforming the second said portion by electro-mechanical engagement of the same.

17. A process as claimed in claim 16 comprising selectively locking the loop against action of the spring.

18. A tape transport system as claimed in claim 14 comprising retaining the shape of the loop while displacing the movable guides.

* * * * *